United States Patent
Inamura et al.

(10) Patent No.: US 9,427,708 B2
(45) Date of Patent: Aug. 30, 2016

(54) HOLLOW FIBER MEMBRANE MODULE

(71) Applicant: NOK Corporation, Tokyo (JP)

(72) Inventors: Tamio Inamura, Kanagawa (JP); Yoshihide Takahashi, Kanagawa (JP); Yutaka Koda, Shizuoka (JP); Hirokazu Yamamoto, Shizuoka (JP); Yusuke Ikawa, Shizuoka (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 14/400,058

(22) PCT Filed: Apr. 12, 2013

(86) PCT No.: PCT/JP2013/061058
§ 371 (c)(1),
(2) Date: Nov. 10, 2014

(87) PCT Pub. No.: WO2013/172134
PCT Pub. Date: Nov. 21, 2013

(65) Prior Publication Data
US 2015/0107454 A1    Apr. 23, 2015

(30) Foreign Application Priority Data
May 14, 2012 (JP) ................. 2012-110206

(51) Int. Cl.
B01D 63/02 (2006.01)
B01D 71/02 (2006.01)

(52) U.S. Cl.
CPC ............. *B01D 63/02* (2013.01); *B01D 71/021* (2013.01); *B01D 2313/04* (2013.01); *B01D 2313/20* (2013.01); *B01D 2313/21* (2013.01)

(58) Field of Classification Search
CPC .. B01D 19/0031; B01D 63/02; B01D 71/02; B01D 71/021; B01D 2313/04; B01D 2313/20; B01D 2313/21

USPC .............................................. 96/8
See application file for complete search history.

(56) References Cited

U.S. PATENT DOCUMENTS

| 5,405,528 A | * | 4/1995 | Selbie | .................... B01D 63/02 210/232 |
| 2004/0144712 A1 | * | 7/2004 | Stroh | .................... B01D 63/021 96/8 |

(Continued)

FOREIGN PATENT DOCUMENTS

| DE | 4438327 C1 | 3/1996 |
| JP | 07-299338 | 11/1995 |

(Continued)

OTHER PUBLICATIONS

International Preliminary Report on Patentability from corresponding PCT application No. PCT/JP2013/061058 dated Nov. 18, 2014 (6 pgs).

(Continued)

Primary Examiner — Jason M Greene
(74) Attorney, Agent, or Firm — Brinks Gilson & Lione

(57) ABSTRACT

A hollow fiber membrane module comprising a bundling tube including a body part and head parts placed at both terminals of the body part and O-rings with which the bundling tube is fitted into a housing being attached to outer circumferential surfaces of the head parts, wherein at least one of the head parts are divided into two in a place closer to a terminal of the bundling tube than places where the O-rings are attached while maintaining a cylindrical shape of the head part, and the divided parts have a slidable structure while maintaining a coupled condition therebetween that forms the cylindrical shape. The hollow fiber membrane module is capable of preventing damage effectively on a hollow fiber membrane or the bundling tube due to expansion or contraction of the hollow fiber membrane to be caused by change of an external environment such as temperature.

8 Claims, 1 Drawing Sheet

(56) References Cited

U.S. PATENT DOCUMENTS

| | | | |
|---|---|---|---|
| 2004/0195165 A1* | 10/2004 | Bernard | B01D 63/02 210/321.89 |
| 2006/0113235 A1* | 6/2006 | Strohm | B01D 63/02 210/232 |
| 2007/0007193 A1* | 1/2007 | Uchi | B01D 63/02 210/321.79 |
| 2008/0128348 A1* | 6/2008 | Blum | B01D 53/22 210/251 |
| 2014/0084511 A1* | 3/2014 | Ackland | B01D 63/022 264/277 |
| 2015/0182916 A1* | 7/2015 | Kanai | B01D 63/02 210/321.89 |

FOREIGN PATENT DOCUMENTS

| | | |
|---|---|---|
| JP | 2004-050093 | 2/2004 |
| JP | 2006-061783 | 3/2006 |
| JP | 2006-064189 | 3/2006 |
| JP | 2008-238068 | 10/2008 |

OTHER PUBLICATIONS

International Search Report from corresponding PCT application No. PCT/JP2013/061058 dated Jul. 2, 2013 (4 pgs).

* cited by examiner

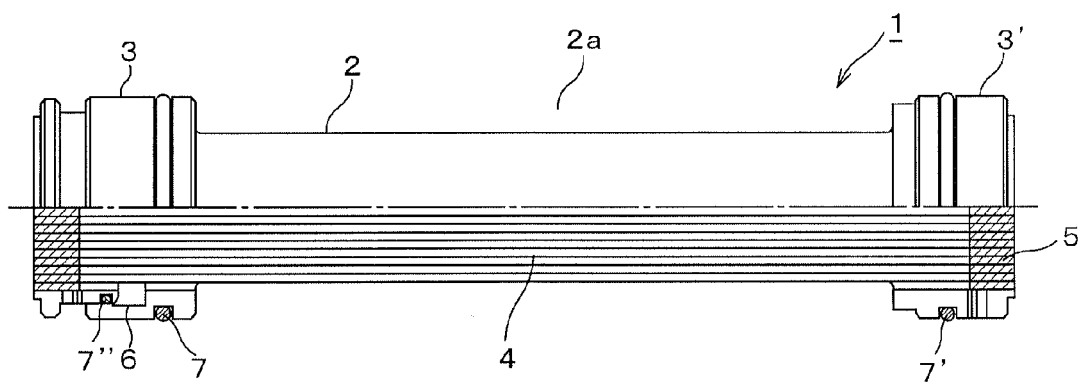

HOLLOW FIBER MEMBRANE MODULE

RELATED APPLICATION

This application is a 35 U.S.C. §371 national phase filing of International Patent Application No. PCT/JP2013/061058, filed Apr. 12, 2013, through which and to which priority is claimed under 35 U.S.C. §119 to Japanese Patent Application No. 2012-110206, filed May 14, 2012, the entire disclosure of which is hereby expressly incorporated by reference.

TECHNICAL FIELD

The present invention relates to a hollow fiber membrane module. More particularly, the present invention relates to a hollow fiber membrane module capable of preventing damage effectively on a hollow fiber membrane or a bundling tube due to expansion or contraction of the hollow fiber membrane to be caused by change of an external environment such as temperature.

BACKGROUND ART

A hollow fiber membrane has many porous structures formed in the membrane in terms of its structure, so that it expands or contracts largely as a result of change of an external environment such as temperature. A hollow fiber membrane may be subjected to process such as filtration, condensation or degassing of a solvent in terms of its function. In this case, the material of the hollow fiber membrane itself may be swelled by the solvent.

A hollow fiber membrane module includes hundreds or thousands of such hollow fiber membranes housed in a bundling tube. Even though the contractile force of one hollow fiber membrane may be small, the contractile forces of all hollow fiber membranes housed in the bundling tube act on the bundling tube because all the housed hollow fiber membranes expand or contract. Thus, in the hollow fiber membrane module comprising including the bundling tube housing the hollow fiber membranes and potting parts formed at both ends of the bundling tube, expansion of the hollow fiber membranes in the longitudinal direction may make the hollow fiber membranes protrude from the bundling tube as a result of an integral structure of the bundling tube, the hollow fiber membranes may be pressed against a fence for prevention of the protrusion to be damaged, or the contraction of the hollow fiber membranes in the longitudinal direction may damage the hollow fiber membranes or the bundling tube.

PRIOR ART DOCUMENT

Patent Document

Patent Document 1: JP-A-2006-64189
Patent Document 2: JP-A-2008-238068
Patent Document 3: JP-A-2006-61783

OUTLINE OF THE INVENTION

Problem to be Solved by the Invention

An object of the present invention is to provide a hollow fiber membrane module capable of preventing damage effectively on a hollow fiber membrane or a bundling tube due to expansion or contraction of the hollow fiber membrane to be caused by change of an external environment such as temperature.

Means for Solving the Problem

The aforementioned object of the present invention is achieved by a hollow fiber membrane module comprising a bundling tube including a body part and head parts placed at both terminals of the body part and O-rings with which the bundling tube is fitted into a housing being attached to outer circumferential surfaces of the head parts, wherein at least one of the head parts are divided into two in a place closer to a terminal of the bundling tube than places where the O-rings are attached while maintaining a cylindrical shape of the head part, and the divided parts have a slidable structure while maintaining a coupled condition therebetween that forms the cylindrical shape.

Effect of the Invention

In the hollow fiber membrane module according to the present invention, the slidable cylindrical body divided parts are arranged in the place closer to the terminal than the places where the O-rings used for fitting the bundling tube into the housing are attached. This achieves an excellent effect in that it is capable of preventing damage effectively on a hollow fiber membrane or the bundling tube due to expansion or contraction of the hollow fiber membrane to be caused by change of an external environment such as temperature.

Patent document 1 suggests a humidifying device capable of preventing damage on an inner pipe due to heat contraction of a hollow fiber membrane. The humidifying device includes a bundle of hollow fiber membranes, a housing that houses the bundle, and the inner pipe arranged in the housing. The inner pipe causes a first fluid to flow along the outside of each hollow fiber membrane. When a second fluid flows in the inner hollow portion of each hollow fiber membrane, moisture is transferred between the first and second fluids. In this humidifying device, a coupled member is provided in the housing that is coupled to the inner pipe in a manner that allows the coupled member to make sliding movement with the inner pipe.

As described above in this humidifying device, the sliding mechanism is provided with the intension of preventing damage on the inner pipe to be caused if the hollow fiber membranes expand or contract in the longitudinal direction during "modularization." In this humidifying device, if sealing members (O-rings) are provided as seals for fixation at heads parts as in the present invention, both of these head parts at both terminals with the sealing members become hard to make sliding movement.

BRIEF DESCRIPTION OF DRAWINGS

FIG. 1 is a partial half-cut front view showing an embodiment of a hollow fiber membrane module according to the present invention.

EMBODIMENTS FOR CARRYING OUT THE INVENTION

A hollow fiber membrane module according to the present invention comprises a bundling tube including a body part and head parts joined to both terminals of the body part, and O-rings with which the bundling tube is fitted into a housing being attached to outer circumferential surfaces of the head parts, wherein at least one of the head parts are divided into two in a place closer to a terminal of the bundling tube than places where the O-ring are attached while maintaining a cylindrical shape of the head part, and the divided parts have a slidable structure while maintaining a coupled condition therebetween that forms the cylindrical shape. The following describes an embodiment of the hollow fiber membrane module according to the present invention in detail by referring to the drawings.

Example

As shown in FIG. 1, a hollow fiber membrane module 1 includes a bundling tube body part 2 housing a hollow fiber membrane group 4 inside, and bundling tube head parts 3 and 3' provided at both terminals of the bundling tube body part 2. The bundling tube head parts 3 and 3' let the hollow fiber membrane group pass therethrough. The bundling tube head parts 3 and 3' each have a potting part 5 that fixes the hollow fiber membrane group. As an example, the bundling tube body part 2 is formed of a cylindrical member of an elongated tube shape having an opening part formed in a side surface of the bundling tube body part 2 in which a fluid is to flow. The bundling tube body part 2 may be provided with opening parts 2a in the shape of long holes formed in two symmetric places on both sides of the tube with respect to the central axis of the tube to extend along the substantially entire length of the tube. The opening parts 2a are arranged in a symmetric pattern with respect to the center axis. The bundling tube body part 2 may also be provided with opening parts in the shape of ovals or short holes formed by cutting the bundling tube body part 2 in four places in total on both sides of the tube near both end portions thereof and symmetric with respect to the central axis of the tube. These opening parts are arranged in a bilaterally symmetric pattern (see FIGS. 2 and 3 of patent document 2). These opening parts in the shape of long holes or short holes formed in the side surface of the body part are intended for outflow and inflow of a fluid through which a fluid such as gas is made to contact the hollow fiber membrane group and to pass through the hollow fiber membrane group. The opening part formed in one place may achieve the purpose of outflow and inflow of a fluid. Meanwhile, it is preferable that opening parts in multiple places be arranged in a bilaterally symmetric pattern. The bundling tube body part 2 can be made of an airtight material having resistance to heat and having a thermal expansion coefficient same as or close to that of hollow fiber membranes housed in the bundling tube body part 2.

In this way, the bundling tube body part 2 is provided with the opening parts 2a for outflow and inflow of a fluid equally arranged in symmetric places on both sides of the tube body in a symmetric pattern. This can minimize the occurrence of flexure or deflection due to nonuniform thermal expansion that may occur in a structure where the opening parts 2a are formed in an asymmetric pattern. Specifically, this symmetric pattern suppresses thermal deformation of the bundling tube body part 2, so that the occurrence of stress concentration on a different member such as a hollow fiber membrane due to the influence of this thermal deformation can be prevented. Thus, this symmetric pattern effectively acts to avoid a situation such as damage on the module.

As the hollow fiber membrane group 4, a hollow fiber membrane group including a bundle of hundreds or thousands of hollow fiber membranes such as porous carbon hollow fiber membranes or porous ceramic hollow fiber membranes is housed in the bundling tube body part 2. The housed hollow fiber membrane group passes through the bundling tube head parts 3 and 3' and is fixed by the potting parts 5. The bundling tube head parts 3 and 3' are made of the same material as the bundling tube body part 2. The porous carbon hollow fiber membranes to be used may be formed by sintering a resin-based material such as a polyphenyleneoxide-based material, a polyimide-based material, a polysulphone-based material, or a cellulose-based material. The porous ceramic hollow fiber membranes to be used may be made of $Al_2O_3$, $Y_2O_3$, MgO, $SiO_2$, $Si_3N_4$ or $ZrO_2$, for example.

A sliding part 6 is formed at one or both of the bundling tube head parts 3 and 3' provided at both terminals of the bundling tube body part 2. The bundling tube head part is divided into two while maintaining a cylindrical shape of the bundling tube head part. The divided parts are provided with the sliding part 6. In response to change of a volume inside a bundling tube to be caused by expansion or contraction of hollow fiber membranes in the longitudinal direction due to heat, for example, the sliding part 6 can deal with the volume change by making sliding movement while maintaining a coupled condition between the divided parts that forms the cylindrical shape. Providing the sliding part 6 makes the hollow fiber membrane module expand or contract in the longitudinal direction in response to expansion or contraction of hollow fiber membranes in the longitudinal direction while the coupled condition between the divided parts is maintained. This changes the volume inside the hollow fiber membrane module, thereby preventing damage effectively on hollow fiber membranes or the hollow fiber membrane module. Maintaining the coupled condition that forms the cylindrical shape mentioned herein means that divided bundling tube head members contact each other at an inner circumferential surface of one of the head members and an outer circumferential surface of the other head member. The sliding part 6 may have any structure as long as it can deal with change in the volume inside the bundling tube while maintaining the coupled condition that forms the cylindrical shape. In the divided parts composed of two cylindrical bodies, for example, as shown in FIG. 1, each of these cylindrical bodies are given steps formed at corresponding end portions and the cylindrical bodies are coupled while fitting these steps each other. As another example, one of the cylindrical bodies has an outer diameter same as the inner diameter of the other cylindrical body and the cylindrical bodies are coupled while fitting them each other.

Patent document 3 discloses in FIGS. 3 and 4 that divided parts formed by dividing a bundling tube into two have a sliding structure while maintaining a coupled condition therebetween. However, this sliding part is provided in a part corresponding to the bundling tube body part of the present invention, so that this embodiment is different from that of the present invention as an O-ring of this embodiment provided in a bundling tube head part makes a sliding mechanism hard to function.

In order to enhance the airtightness of the hollow fiber membrane module, it is preferable that an O-ring 7" be attached to a coupled portion of the sliding part 6, specifically a portion where the divided bundling tube head members contact each other.

The hollow fiber membrane module 1 of the aforementioned structure is fitted to a housing by attaching the bundling tube head parts 3 and 3' of the hollow fiber membrane module 1 via O-rings 7 and 7' as sealing members in a hermetically sealed manner. The O-rings 7 and 7' are arranged on the outer circumferential surfaces of the bundling tube head parts 3 ands 3'. If the bundling tube head parts 3 and 3' are provided with the sliding parts 6, the O-rings 7 and 7' are arranged in places closer to the bundling tube body part 2 than places where the sliding parts 6 are arranged.

REFERENCE SIGNS LIST

1 Hollow fiber membrane module
2 Bundling tube body part
2a Opening part
3, 3' Bundling tube head part
4 Hollow fiber membrane group
5 Potting part
6 Sliding part
7, 7' 7" O-ring

The invention claimed is:

1. A hollow fiber membrane module comprising a bundling tube including a body part housing a hollow membrane group inside and head parts placed at both terminals of the body part and O-rings with which the bundling tube is fitted into a housing being attached to outer circumferential surfaces of the head parts, wherein at least one of the head parts are divided into two in a place closer to a terminal of the bundling tube than places where the O-rings are attached while maintaining a cylindrical shape of the head part, and the divided parts have a slidable structure while maintaining a coupled condition therebetween that forms the cylindrical shape.

2. The hollow fiber membrane module according to claim 1, wherein the divided parts are formed of two cylindrical bodies, both of the cylindrical bodies are given steps formed at corresponding end portions where the cylindrical bodies are coupled, and the cylindrical bodies are coupled while these steps fit each other.

3. The hollow fiber membrane module according to claim 1, wherein the divided parts are formed of two cylindrical bodies, one of the cylindrical bodies has an outer diameter same as the inner diameter of the other cylindrical body, and the cylindrical bodies are coupled while the outer and inner diameters fit each other.

4. The hollow fiber membrane module according to claim 1, wherein an O-ring is attached to a coupled portion of the slidable structure.

5. The hollow fiber membrane module according to claim 1, wherein the bundling tube body part is formed of a cylindrical member that has an opening part or opening parts formed in a side surface or side surfaces of the bundling tube body part, in which a fluid is to flow.

6. The hollow fiber membrane module according to claim 5, wherein the opening parts of the bundling tube body part are equally arranged in places on both sides of the body part in a symmetrical pattern.

7. The hollow fiber membrane module according to claim 2, wherein an O-ring is attached to a coupled portion of the slidable structure.

8. The hollow fiber membrane module according to claim 3, wherein an O-ring is attached to a coupled portion of the slidable structure.

* * * * *